Oct. 5, 1926.

C. A. GRIFFITH

RAILWAY

Filed Sept. 30, 1924

C. A. GRIFFITH

RAILWAY

Filed Sept. 30, 1924

Inventor
Charles A. Griffith
Cyrus K. Keer
By
Attorney

Oct. 5, 1926. 1,602,015
C. A. GRIFFITH
RAILWAY
Filed Sept. 30, 1924 6 Sheets-Sheet 4

Oct. 5, 1926.　　　　　　　　　　C. A. GRIFFITH　　　　　　　　1,602,015
RAILWAY
Filed Sept. 30, 1924　　　6 Sheets-Sheet 6

Inventor
Charles A. Griffith
By Cyrus Kehr
Attorney

Patented Oct. 5, 1926.                                               1,602,015

UNITED STATES PATENT OFFICE.

CHARLES A. GRIFFITH, OF KNOXVILLE, TENNESSEE.

RAILWAY.

Application filed September 30, 1924.  Serial No. 740,819.

My improvement relates particularly to railways in which provision is made for dumping loose material through the bottom of a car at a chosen point on the track of the railway. The chief use of such cars is for the hauling of coal and other minerals from mines.

This invention is allied to the inventions of my Letters Patent of the United States, No. 1,268,344, dated June 4, 1918, and to Letters Patent of the United States, No. 1,268,390, granted to Hugh W. Sanford, June 4, 1918, the cars of said patents being provided with hinge bottom doors adapted to be turned downward for dumping the material in the car.

The cars of the above-mentioned Letters Patent are relatively narrow, the lower part of the car body being between the car wheels, and the distance between the car wheels being limited by the gage of the track on which the car is to run. The object of the present invention is to provide wider car bodies for a track of the same gage, the wheels, to attain this end, being placed within the car body frame, and the frame being provided with bottom doors which are hinged and held in the closed position by latch mechanism, the doors being adapted to turn downward on their hinges below the level of the lower parts of the car wheels, and below the level of the track rails.

The doors being wider than the track and wider than the space between the car wheels, the car must be of special construction and special track provision must be made to afford space for the downward turning of the doors when the car is to discharge its load.

In the accompanying drawings:—

Referring to said drawings, A, A, are rails of the regular track. These rest on ties, $A^1$. B, B are ordinary car wheels applied to the axles, C, C. D is the body of the car. $D^1$, $D^1$ are channel-form side sills forming portions of the frame of the car. The ends of these sills are joined by end sills, $D^2$. Bearing boxes, $C^1$, are seated in openings in the upright webs of the side sills and receive the axles, C. These bearing boxes have lateral flanges, $C^2$, lying against said web and secured to the latter by means of bolts, $C^3$. The axles project outward through the bearing boxes, $C^1$, and there receive a cotter, $C^4$. The wheels, B, surround the axles, C, between the side sills, $D^1$, and the bearing boxes, $C^1$, each wheel being next to one of the bearing boxes. Thus the side sills are farther apart than would be the case if they were between the wheels, B. Hence the frame forming the lower part of the car body is wider than it could be if the side sills were between the wheels.

Figure 1:
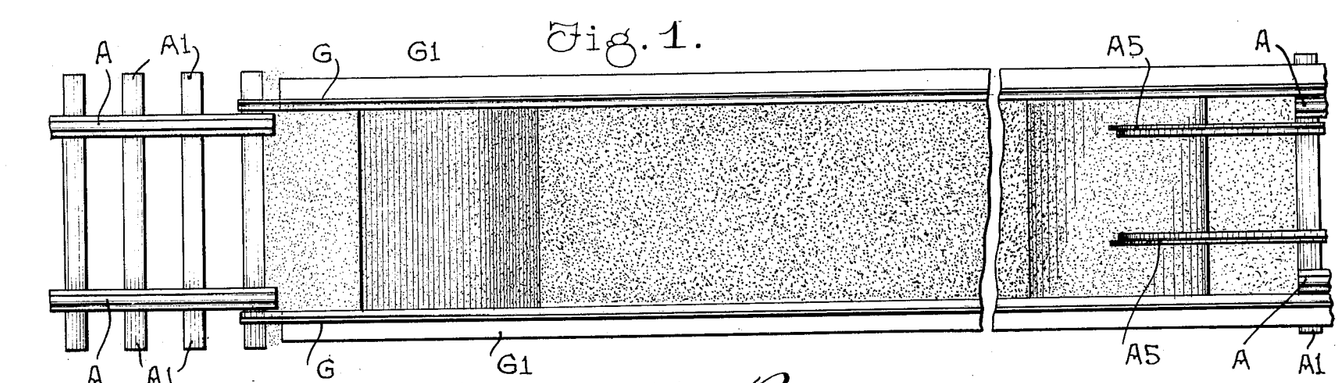
Fig. 1 is a plan of a track at an unloading place or dumping station.
Figure 2:
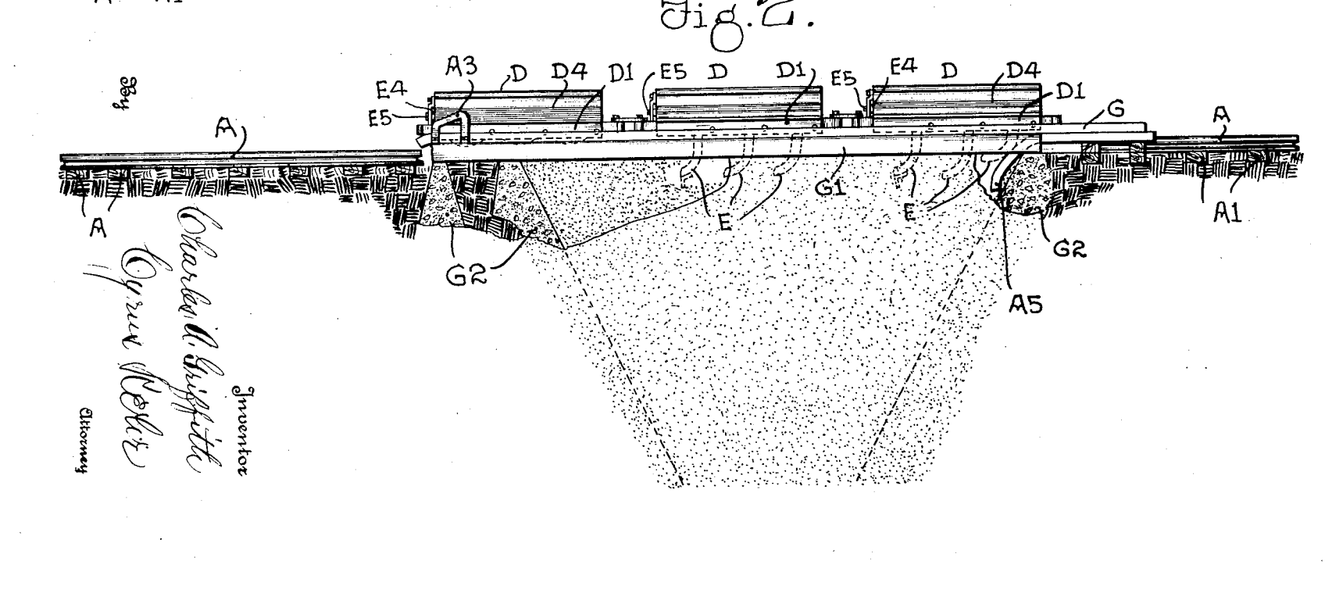
Fig. 2 is a sectional elevation showing the trackage and three cars at a dumping station.
Figure 3:
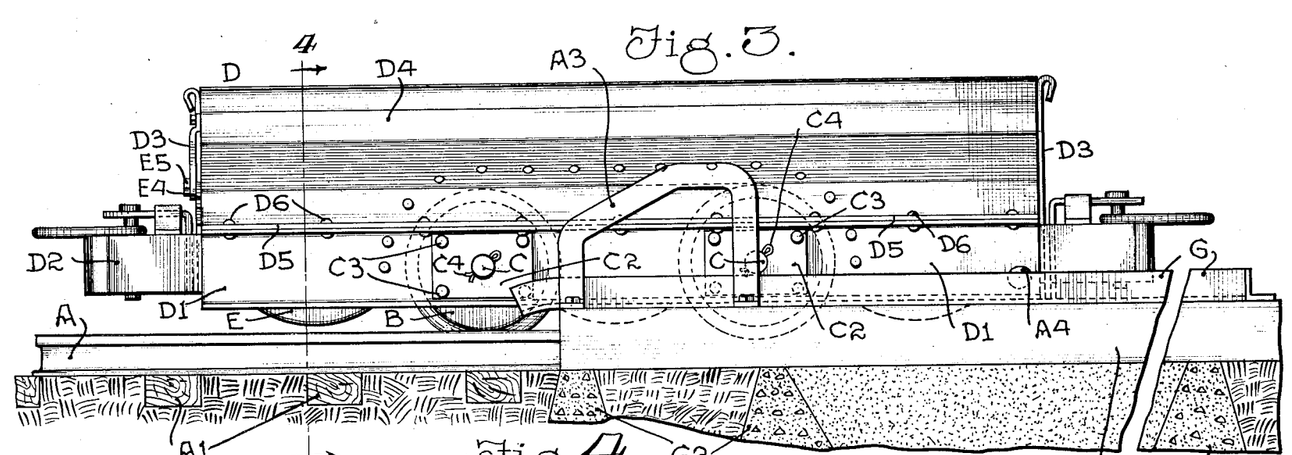
Fig. 3 is a side elevation of a car and a portion of a track illustrating my improvement.
Figure 4:
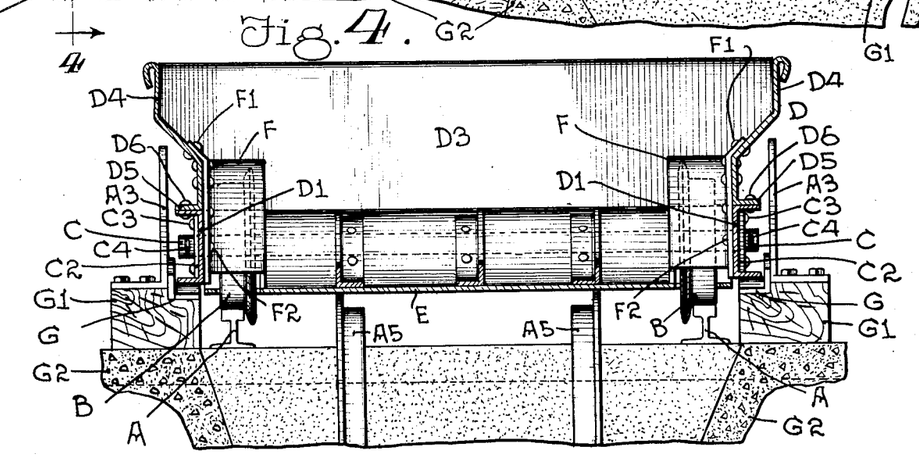
Fig. 4 is an upright, transverse section on the line, 4—4, of Figs. 3 and 5, looking toward the right, it being assumed that the bottom doors are closed.
Figures 5, 6:
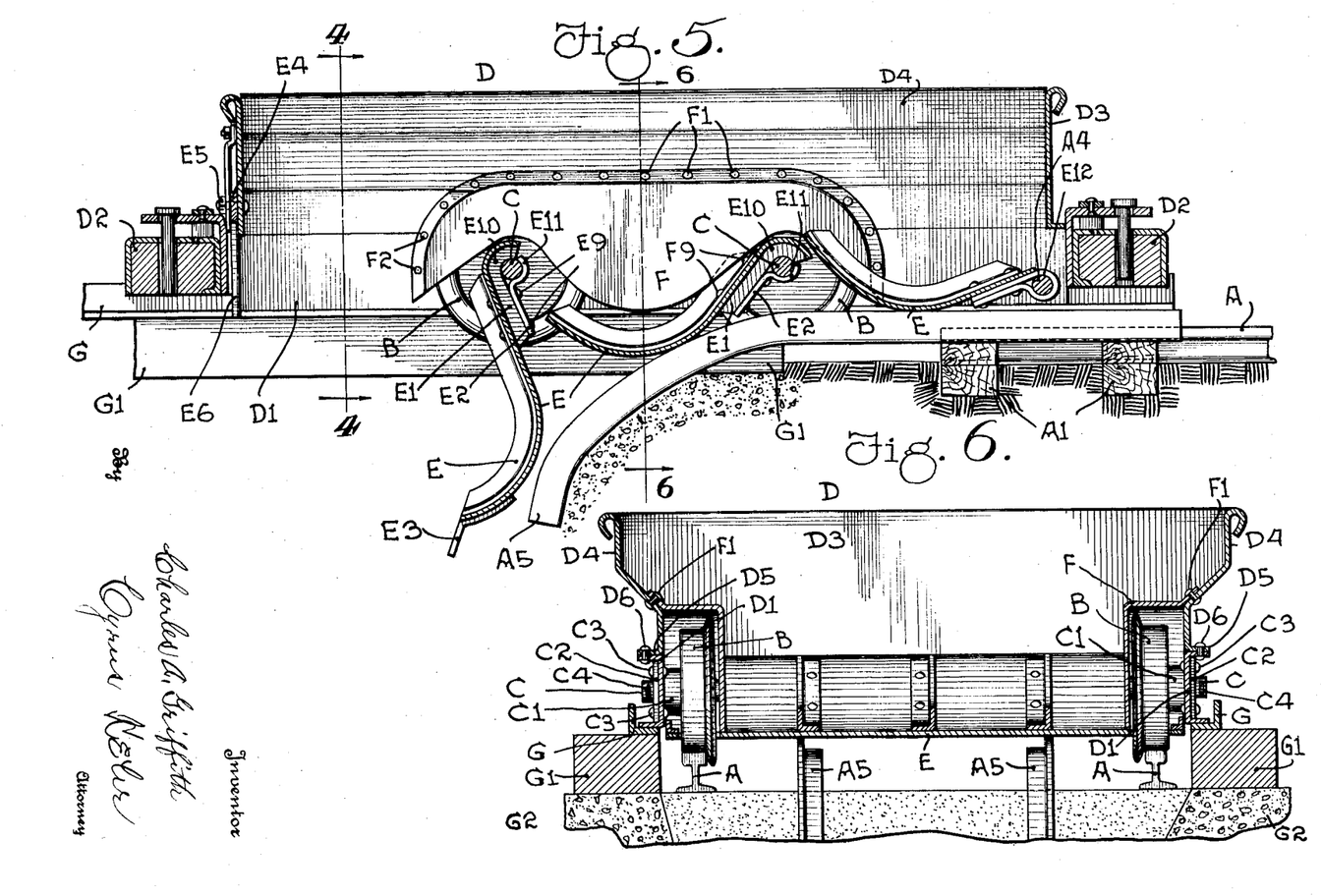
Fig. 5 is an upright, longitudinal section on the line, 5—5, of Fig. 7.
Fig. 6 is an upright, transverse section on the line, 6—6, of Fig. 5, looking toward the right.
Figure 7:
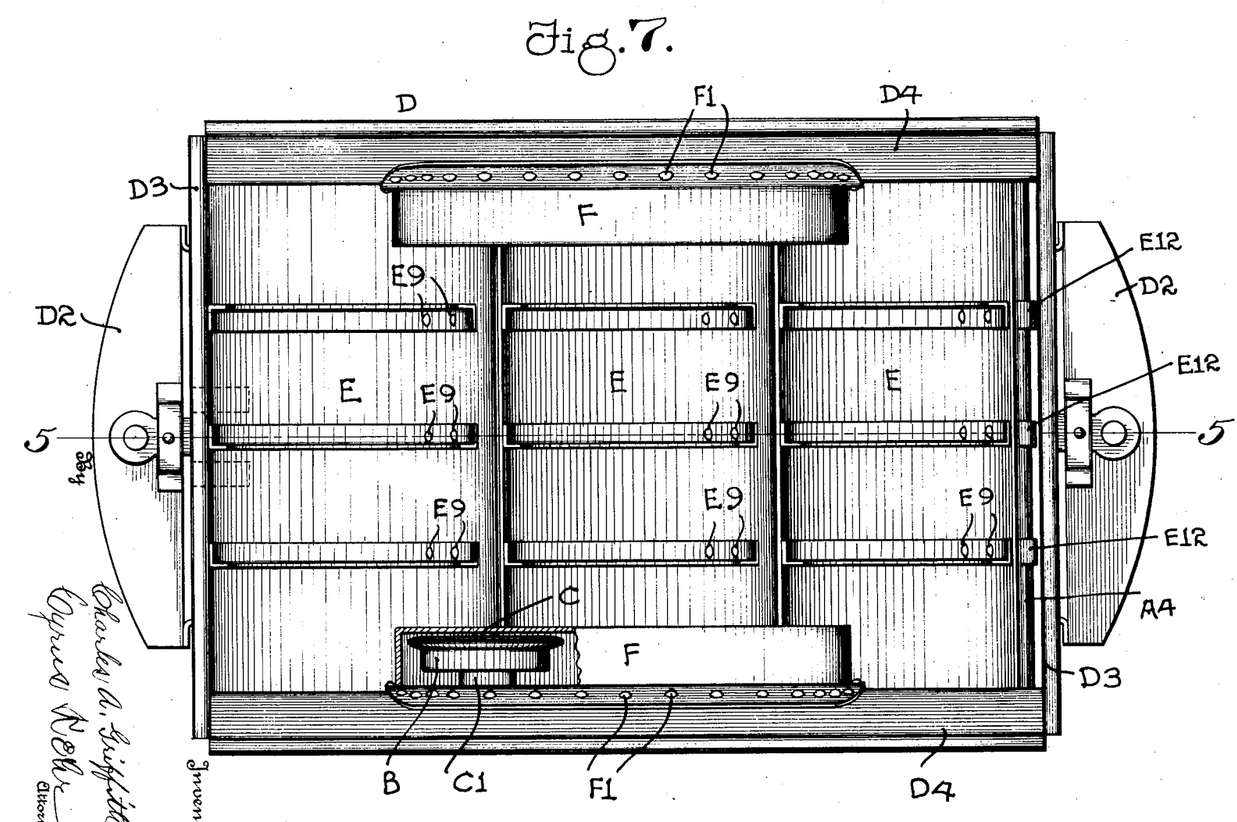
Fig. 7 is a plan of a car embodying my improvement, a part being broken away.
Figure 8:
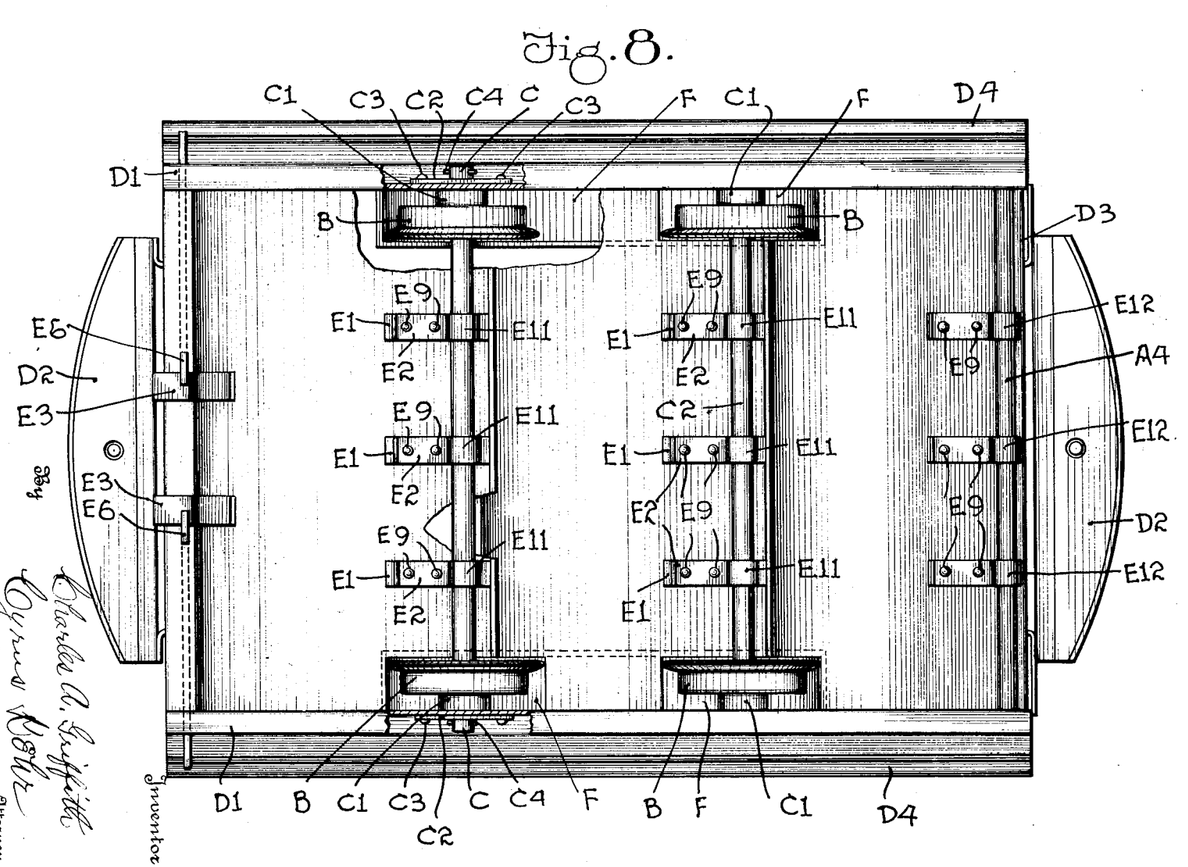
Fig. 8 is a bottom view of the car, portions being broken away.
Figure 9:
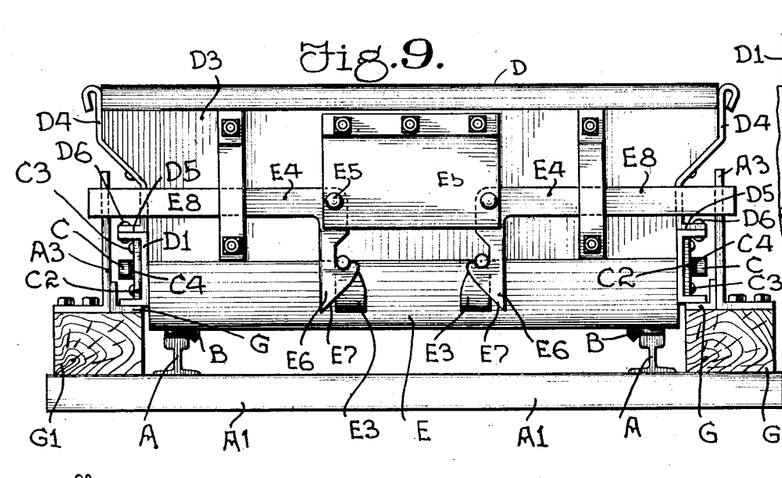
Fig. 9 is an elevation showing the rear end of the car.

The end of the car at the right, as viewed in Figs. 3, 4 and 5 of the drawings, is the forward end of the car, and it is to be understood that the car moves forward for dumping and for closing the doors after the load has been dumped or discharged from the car. The discharge is downward through a space as wide as the space between the side sills, $D^1$, but the total open space in the car frame is reduced by the wheel housings. As will appear further on, the rails, A, A, are absent at the dumping station.

Three doors, E, are placed in series to form the bottom of the car. The rearmost of these three doors controls the series; hence it may be regarded as the first of the series and for that reason is described first. Said door has at its forward edge, three pairs of hinge members, $E^1$ and $E^2$, as hereinafter described. At its rear edge, two bars or arms, $E^3$, are attached to the lower face of the door and project a little way rearward of said rear edge. On the rear end of the car body and in an upright plane transverse to the length of the car body are a pair of large bell cranks, $E^4$, pivoted at $E^5$, to the upright end wall, $D^3$, of the car body. Each of said bell cranks has a hook, $E^6$, adapted to extend beneath the adjacent bar or arm, $E^3$. Each bell crank is so arranged as to bring its pivot, $E^5$, above the hook, whereby the arm bearing the hook may swing toward and from the upright, middle longitudinal plane of the car while the arm, $E^8$, of the bell crank extends horizontally outward and by its preponderating weight tends to tilt the bell crank so as to move said hook toward said plane. Each of said hooks has a bevel face, $E^7$, adapted to be engaged by the adjacent bar or arm, $E^3$, when the latter is carried upward by the upward movement of the rear portion of the door into the closed position.

When said bars, $E^3$, thus rest on the hooks, $E^6$, said door is held firmly in its upper or closed position, and this condition continues until said hooks are moved outward far enough to allow the bars, $E^3$, to descend. Said hooks are made to move outward by raising the horizontal arms, $E^8$, of the bell cranks. To cause said arms to rise automatically when the car reaches the dumping station, a cam member, $A^3$, is placed at each side of the track in position to engage the lower edge of the adjacent latch arm, $E^8$, and cause said arm to ride upward on said cam member during the further forward movement of the car, the arm, $E^8$, being long enough to bring said cam member into the path of said arm. It is to be observed that said door will not become released unless both arms, $E^8$, are raised. Hence said door will not ordinarily become released through the accidental raising of one of said arms by means other than one of said cam members. Thus the latch mechanism is duplex, and both parts must ordinarily operate simultaneously before the door becomes released.

Said door has at its front edge three pairs of hinges each comprising a block, $E^1$, and a strap, $E^2$. Rivets, $E^9$, extend through said strap and said block and the door, E, and bind said members to each other. The under part of the block, $E^1$, has a concave portion, $E^{10}$, to receive the upper part of the axle, C; while the strap, $E^2$, has a reversely concave portion, $E^{11}$, which conforms to the lower side of the axle. The forward part of the door and the hinge block, $E^1$, are curved to be approximately concentric to the axle, C.

When thus constructed, the weight of the part of the first door which is rearward of the axle, C, plus the weight of the material resting on said rearward part of said door is ample to overcome the resistance to turning of the first door offered by the next forward door and the material bearing downward upon the part of the first door forward of said plane. In practice, it has been found that this frictional resistance is substantially uniform and always so small as to readily be overcome by the weight of the door and the load thereon at the rear of said plane.

Although, as above described, duplex latch mechanism is provided for holding the rear part of the first door in its elevated position, provision should be made for accidental conditions which release said door. If that occurs when the car is not at an unloading station, it is desirable to avoid the releasing of the other doors. For that reason, the next forward door should normally bear upon the released first door long enough to remain in engagement when the first door accidentally falls and rests upon the ties of the track.

At the same time, it is desirable that, when the car is at an unloading station, disengagement between the edges of the two doors be effected early enough during the turning of the rear door to allow the rear edge of the next forward door to descend across the rear portion of the path of the first door before the first door enters the path of the second door. This is to avoid slamming of the first door against the second door and thereby interfering with the movement of the doors and avoiding injury to the doors.

This inter-relation of the two doors can best be established by making the hinge block, $E^1$, of considerable thickness so as to bring the upper surface of the door to a suitable distance from the axle, C, whereby the distance between the forward edge of the first door and the normal line of contact between the doors is increased.

The forward portion of the second or middle door, E, is curved and provided with hinges as described concerning the first door, and the second door and the rear edge of the third door are brought into relation with each other as described concerning the first door and the second door, the rear edge of said second door extending far enough rearward to lie upon the forward part of the first door, as already described, when said doors are in the raised or normal position.

At the forward end of the car there is a shaft, $A^4$, which is horizontal and transverse to the length of the car and has its ends resting in the side sills, $D^1$. On the forward edge of said door are three ears or hinge members, $E^{12}$, through which said shaft extends. The rear edge of said door rests upon the forward part of the second door when the latter is in the upper or closed position.

As soon as the first or latch-controlled door has been released, as above described, the portion rearward of its hinge turns downward in response to the preponderating action of gravity upon said portion, while the curved portion of said door which is forward of said hinge slides along the material and the second door resting thereon until the first door is freed from the rear edge of the second or middle door. Thereupon said second door in similar manner turns upon its hinge and frees its forward edge from the rear edge of the third door. Thereupon, the third door similarly turns upon its hinge; but it is the last of the series and does not release another door.

Thus we have a series of doors forming bottom sections, each being hinged at its forward portion on an axis which is horizontal and transverse to the body of the car, the rearmost door being held in its upper or closed position by latch mechanism and each of the other doors being held in position by the next rearward door so long as the latter retains its horizontal or closed position. Obviously the number of doors in the series may be varied.

When all the doors have been released and allowed to turn for the downward discharge of the load, the continued movement of the car brings the lower face of the forward door into engagement with stationary members, $A^5$, located upon the track between the rails, A, and forming a closing cam rising to a sufficient height to force the rear portion of said door upward a little way above its normal position. Said cam members are extended horizontally far enough to maintain their engagement with the forward door until the other two doors have successively in the same manner engaged the inclined portion of said closing cam and have been forced upward thereby. While the rear or latch-controlled door is being thus forced upward, the arms or bars, $E^3$, engage the bevel faces, $E^7$, of the hooks, $E^6$, and force said hooks laterally until said arms are above said hooks, whereupon the latter move inward into position beneath said bars. After this has been done, the three doors pass successively out of engagement with the closing cam. As soon as the forward door is out of such engagement, it falls slightly until its rear edge rests upon the forward part of the next or middle door, and as soon as the middle door passes out of engagement with said cam, the rear portion of said door falls until its rear edge rests upon the forward part of the rear or latch-controlled door. As already described, this last door is now in position to be held by the latch mechanism. Thus all the doors have been raised and secured automatically in the closed position and the car is again ready for a new load.

It will now be seen that a train of such cars may be moved forward over the rails, A, to and beyond the dumping station, the doors being automatically opened and afterward automatically closed while the train is in motion. This gives high capacity to the dumping station. Any number of trains comprising convenient numbers of such cars may pass the dumping station in quick succession.

The side walls, $D^4$, of the car body rise from the side sills, $D^1$, each side wall having a lower flange, $D^5$, turned outward horizontally and resting on the upper flange of the adjacent side sill and secured to said flange by bolts or rivets, $D^6$. These side walls meet the upright end walls, $D^3$, of the car body.

The three doors are to fill the space between the side sills and the end sills as far as is permitted by the wheels. The parts of the doors adjacent and parallel to the side sills are the ends of the doors. A portion of the first and third doors is cut away at each end to avoid the adjacent wheels, and each end of the second or middle door is cut away to extend only to the adjacent wheels. The wheels are covered by housings as will be next described, each housing being shown as extending over two wheels, the wheels being near each other.

A hood or housing, F, extends over the wheels, B, at each side of the car (see Figs. 5, 6, 7 and 8). The upper edge of each hood overlaps a part of the adjacent side wall, $D^4$, and is secured to said wall by bolts or rivets, $F^1$. At the ends of the hood, the corresponding edge overlaps the inner face of the side sill and is secured thereto by bolts or rivets, $F^2$. The upright part of the hood extends downward to meet the upper faces of the doors when the latter are in the closed positions. Since the doors are curved, this part of the hood is to be correspondingly curved if it is to be above the doors when the latter are closed. If said part of the hood is to extend downward across the edges of the doors, said part of the hood may be straight, excepting that it must be cut out to receive the axles, C.

Figure 10:
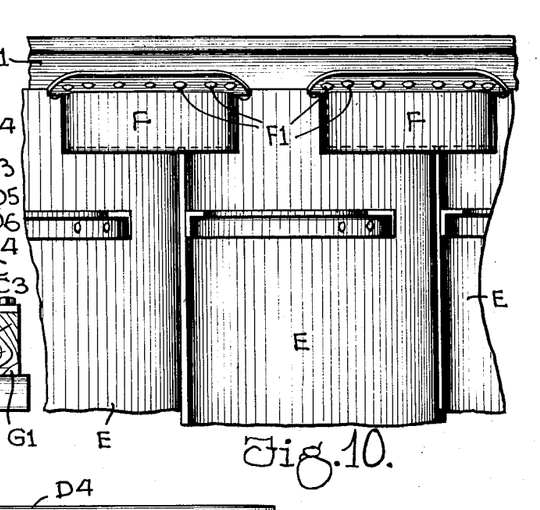
Fig. 10 is a detail plan showing the wheels of the car provided with separate housings.
Figure 11:
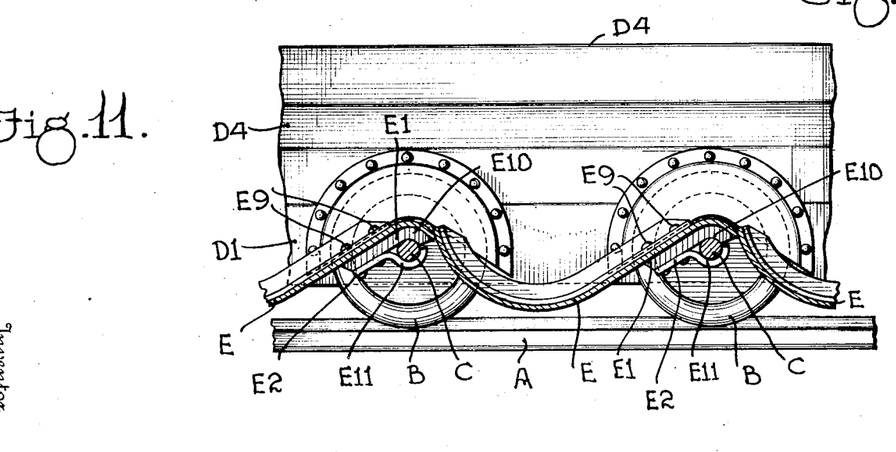
Fig. 11 is an upright section on the line, 11—11, of Fig. 10.

If the axles are considerably separated whereby the wheels are considerably separated, each wheel may be given a single housing, and the middle door allowed to extend between the wheels to the side sill, as shown in Figs. 10 and 11.

The bottom doors being wider than the space between the rails, A, A, said doors can not turn downward into the dumping position while said rails are under the car. Hence said rails are omitted at the dumping station or across the space through which the load is to be discharged.

Near the ending of the rails, A, A, auxiliary or secondary rails, G, G, are placed on suitable supports and in position to engage the lower edges of the side sills, D¹. These secondary rails are shown in the form of metal angles resting on longitudinal sills, G¹, which rest on piers, G², each angle rail, G, having a horizontal flange resting on the sill and having an upright flange extending upward over the outer edge of the flange of the side sill. The latch-actuating cams, A³, are also supported on the sills, G¹.

Being thus positioned, the auxiliary or secondary rails, G, allow the side sills, D¹, to slide on the horizontal flange of the auxiliary rails, and the upright flanges of the auxiliary rails hold the car body against sidewise movement.

The rails, G, extend over the gap in the track formed by the rails, A, and both ends of the rails, G, over-lap the rails, A, so far that when the car approaches the dumping station, the side sills assume position above the auxiliary rails, G, before the car wheels, B, leave the rails, A, and when the car wheels are about to leave the rails, G, the wheels, B, will be in position on the rails, A. Thus the car may pass the gap in the rails, A, without disturbing the course of the car.

As above described, as soon as the forward movement of the car brings the arm, E⁸, of the latch mechanism into engagement with the cam members, A³, said arms, E⁸, are forced upward, whereby the bell crank is tilted for the release of the hooks, E⁶, from the tongues or bars, E³, whereby the rearmost or first of the series of doors is made free to turn downward by the action of gravity and allow the other doors to turn, all the doors going between the rails, G.

The tracks leading to the dumping station may be given a sufficient down grade to cause cars running free to acquire a sufficient momentum to drive them across the dumping station. In lieu of this, a locomotive may push all but the rear of a long trip of cars across the dumping station. Or a by-pass track (not shown) may extend around the dumping station and carry a locomotive connected to cars by a long cable, the locomotive going forward on the by-pass track while the cars are drawn across the dumping station.

Figure 12:
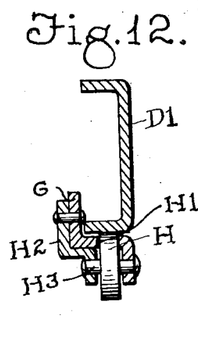
Fig. 12 is an upright section showing an anti-friction roller applied to one of the side sills of the car.

Any number of anti-friction rollers, H, may be applied to the auxiliary rails, G, in the manner shown by Fig. 12. In that figure a roller, H, extends through a slot, H¹, in the lower flange of the rail, G, and bears against the lower face of the side sill. A brace, H², is secured to the upright web of the side sill and extends downward to form a bearing for one end of the roller axle, H³. The other end of said axle rests in a downward extension on the auxiliary rail.

I claim as my invention:—

1. The combination of a car body having fixed sides and ends the sides having fixed bearings, axles in said bearings, wheels on the axles between the bearings, hinged bottom doors having their ends formed to clear the wheels, wheel supporting rails laid to form a track in which is a gap, and auxiliary rails extending across said gap and positioned to engage the car body outside the end edges of the doors, substantially as described.

2. The combination of fixed side sills, end sills, bearings fixed on the side sills, axles in said bearings, wheels on the axles between the side sills, hinged bottom doors extending across the space enclosed by the side sills and end sills excepting where that space is occupied by the wheels, wheel supporting rails laid to form a track in which is a gap, and auxiliary rails extending across said gap and positioned to engage the car frame outside the end edges of the doors, substantially as described.

3. The combination of side sills, end sills, bearings on the side sills, axles in said bearings, wheels on the axles between the side sills, hinged bottom doors extending across the space enclosed by the side sills and end sills excepting where that space is occupied by the wheels, side walls rising from the side sills, hoods secured to the side walls and extending over the wheels to meet the doors, wheel supporting rails laid to form a track in which is a gap, and auxiliary rails extending across said gap and positioned to engage the car frame outside the end edges of the doors, substantially as described.

4. The combination of side sills, end sills, bearings on the side sills, axles in said bearings, wheels on the axles between the side sills, hinged bottom doors having their ends formed to clear the wheels, wheel supporting rails laid to form a track in which is a gap, and auxiliary rails extending across said gap and positioned to engage the car outside the end edges of the doors, substantially as described.

5. The combination of side sills, end sills, axles, wheels on the axles between the side sills, hinged doors wider than the space between the wheels on the axles, wheel supporting rails laid to form a track in which is a gap, and auxiliary rails extending across said gap and spaced from each other farther than the width of the doors and positioned to engage the car for supporting the latter while passing said gap, substantially as described.

6. The combination of a car body having fixed sides and ends the sides having fixed bearings, axles in said bearings, wheels on the axles between the bearings, hinged doors having their ends formed to clear the wheels, the second door from the rear having its rear edge in operative relation with the forward edge of the rear door for support, latch mechanism for supporting the rear edge of the rear door, wheel supporting rails laid to form a track in which is a gap, and auxiliary rails extending across said gap and positioned to engage the car body outside the end edges of the doors, substantially as described.

7. The combination of fixed side sills, end sills, bearings fixed on the side sills. axles in said bearings, wheels on the axles between the side sills, hinged bottom doors extending across the space enclosed by the side sills and end sills excepting where that space is occupied by the wheels, wheel supporting rails laid to form a track in which is a gap, and auxiliary rails extending across said gap and positioned to engage the side sills, substantially as described.

8. The combination of fixed side sills, end sills, bearings fixed on the side sills, axles in said bearings, wheels on the axles between the side sills, hinged bottom doors extending across the space enclosed by the side sills and end sills excepting where that space is occupied by the wheels, wheel supporting rails laid to form a track in which is a gap, and angle-form auxiliary rails extending across said gap and positioned to engage the side sills, substantially as described.

9. The combination of a car body having fixed sides and ends the sides having fixed bearings, axles in said bearings, wheels on the axles between the bearings, hinged doors having their ends formed to clear the wheels, the second door from the rear having its rear edge in operative relation with the forward edge of the rear door for support, latch mechanism for supporting the rear edge of the rear door, wheel supporting rails laid to form a track in which is a gap, auxiliary rails extending across said gap and positioned to engage the car body outside the end edges of the doors, and means at said gap for releasing the latch mechanism, substantially as described.

10. The combination of a car body having fixed sides and ends the sides having fixed bearings, axles in said bearings, wheels on the axles between the bearings, hinged doors having their ends formed to clear the wheels, the second door from the rear having its rear edge in operative relation with the forward edge of the rear door for support, latch mechanism for supporting the rear edge of the rear door, wheel supporting rails laid to form a track in which is a gap, auxiliary rails extending across said gap and positioned to engage the car body outside the end edges of the doors, and means at said gap for closing the doors, substantially as described.

11. The combination of a car body having fixed sides and ends the sides having fixed bearings, axles in said bearings, wheels on the axles between the bearings, hinged doors having their ends formed to clear the wheels, the second door from the rear having its rear edge in operative relation with the forward edge of the rear door for support, latch mechanism for supporting the rear edge of the rear door, wheel supporting rails laid to form a track in which is a gap, auxiliary rails extending across said gap and positioned to engage the car body outside the end edges of the doors, means at said gap for releasing the latch mechanism, and means at said gap for closing the doors, substantially as described.

12. The combination of fixed side sills, end sills, axles supported by the side sills, wheels on the axles between the side sills, a hinged bottom between the side sills, wheels supporting rails laid to form a track in which is a gap, and auxiliary rails extending across said gap and positioned to engage the side sills to support the car while crossing said gap, substantially as described.

13. The combination of fixed side sills, end sills, axles supported by the side sills, wheels on the axles between the side sills whereby the side sills are left clear for riding on auxiliary rails, a dumping bottom between the side sills and having wheel openings, substantially as described.

14. In a railway car of the kind described, the combination with a frame comprising side sills and end sills, of axles in a horizontal plane cutting the side sills, an axle-hinged bottom having wheel openings, wheels on the axles between the side sills and extending upward through the wheel openings, and hoods extending over said openings, substantially as described.

15. In a railway car of the kind described, the combination with a frame comprising side sills and end sills, of axles in a horizontal plane cutting the side sills, a plurality of hinged bottom sections having wheel openings, wheels on the axles between the side sills and extending upward through the wheel openings, and hoods extending over said openings, substantially as described.

In testimony whereof I have signed my name, this 26th day of August, in the year one thousand nine hundred and twenty-four.

CHARLES A. GRIFFITH.